US006790886B2

(12) United States Patent
Harashina et al.

(10) Patent No.: US 6,790,886 B2
(45) Date of Patent: Sep. 14, 2004

(54) FLAME-RETARDANT RESIN COMPOSITION

(75) Inventors: Hatsuhiko Harashina, Fuji (JP); Toshio Nakane, Fuji (JP); Shinya Yamada, Fuji (JP); Yuji Tada, Tokushima (JP)

(73) Assignees: Polyplastics Co., Ltd., Osaka (JP); Atsuka Chemical Co., Ltd., Osaka (JP)

( * ) Notice: Subject to any disclaimer, the term of this patent is extended or adjusted under 35 U.S.C. 154(b) by 55 days.

(21) Appl. No.: 09/914,141

(22) PCT Filed: Dec. 25, 2000

(86) PCT No.: PCT/JP00/09178

§ 371 (c)(1),
(2), (4) Date: Aug. 23, 2001

(87) PCT Pub. No.: WO01/48086

PCT Pub. Date: Jul. 5, 2001

(65) Prior Publication Data

US 2003/0004240 A1 Jan. 2, 2003

(30) Foreign Application Priority Data

Dec. 27, 1999 (JP) ............................................ 11-371173

(51) Int. Cl.⁷ .......................................... C08K 5/5399
(52) U.S. Cl. ...................................... 524/116; 524/138
(58) Field of Search ................................. 524/116, 138

(56) References Cited

U.S. PATENT DOCUMENTS

| 5,132,376 A | 7/1992 | Sarubbi ........................ 525/480 |
| 6,362,269 B1 * | 3/2002 | Ishihata et al. ............... 524/449 |
| 6,384,103 B1 | 5/2002 | Arano et al. .................. 522/166 |

FOREIGN PATENT DOCUMENTS

| EP | 0 945 478 | 9/1999 |
| JP | 51-46400 | 4/1976 |
| JP | 3-259939 | 11/1991 |
| JP | 10-168297 | 6/1998 |
| JP | 10-195283 | 7/1998 |
| JP | 11-181268 | 7/1999 |
| JP | 11-181429 | 7/1999 |
| JP | 2001-131395 | 5/2001 |

OTHER PUBLICATIONS

Website homepage for Sumitomo Bakelite Co., Ltd.

* cited by examiner

*Primary Examiner*—Peter Szekely
(74) *Attorney, Agent, or Firm*—Nixon & Vanderhye PC

(57) ABSTRACT

A polyalkylene terephthalate-series resin (e.g., polyethylene terephthalate-series resin, polybutylene terephthalate-series resin) is improved in flame retardancy by using a flame retardant containing a phosphazene compound and a phenolic resin. The phosphazene compound is a compound shown by the following formulae (1) and/ or (2), and/or a compound being the above compound crosslinked with a phenylene group or a crosslinking group shown by the following formula (3a). The proportion of the phosphazene compound to the phenolic resin is the former/the latter=5/95 to 95/5 (weight ratio). By means of the above flame retardant, a polyalkylene terephthalate-series resin can be highly improved in flame retardancy without deteriorating the properties. Further, by adding the other flame retardant (e.g., a nitrogen-containing flame retardant, a phosphate-series flame retardant), and a carbonizable resin, the flame retardancy can be enhanced.

Mechanical Property

In accordance with ASTM D-638 and ASTM D-790, the mechanical strength was determined with use of a test piece obtained by injection molding.

15 Claims, No Drawings

FLAME-RETARDANT RESIN COMPOSITION

TECHNICAL FIELD

The present invention relates to a flame-retardant resin composition comprising a polyalkylene terephthalate-series resin.

BACKGROUND ART

A polyalkylene terephthalate-series resin such as a polybutylene terephthalate has excellent mechanical and electrical properties, weather resistance, water resistance, and resistance to chemicals and solvents. Therefore fore, the resin is used as an engineering plastic in a variety of applications such as electric or electronic device parts, mechanical device parts and automotive parts. While, the resin is required to be flame-retardant from viewpoint of safety as the field of their uses expands. In general, there is known a method for rendering the resin flame-retardant by adding a flame retardant composed of a halogen-containing compound and/or an antimony-containing compound to the resin.

Japanese Patent Application Laid-Open No. 168297/1998 (JP-10-168297A) discloses a flame-retardant resin composition comprising a thermoplastic polyester resin, a polycarbonate-series resin, an organic phosphorus-series flame retardant which is a phosphate-series flame retardant. Japanese Patent Application Laid-Open No. 195283/1998 (JP-10-195283A) discloses a polyester resin composition which is rendered flame-retardant by combining a phosphate having the specific structure, a novolak-type phenol resin and the specific oxide of a metal such as iron, cobalt, nickel or copper in suitable amounts. However, the phosphate-series flame retardant does not contain a harmful halogen, but a large amount of the flame retardant is required because of their inferior flame retardancy to the halogen-containing flame retardant. Thus, a bleed out and deterioration of the mechanical properties of the resin are caused and the mechanical properties can not be improved accompanied with the flame retardancy.

Moreover, Japanese Patent Application Laid-Open No. 181268/1999 (JP-11-181268A) discloses that addition of 1.5 to 15 parts by weight of a phosphazene compound and 0.5 to 30 parts by weight of talc and/or mica to 100 parts by weight of a resin mixture containing an aromatic polycarbonate-series resin and a thermoplastic polyester-series resin in the proportion of 90/10 to 50/50 (weight ratio) renders the resin mixture flame-retardant. However, the resin composition composed of the aromatic polycarbonate has a problem of resistance to solvents, and further, the moldability is lowered because of the inferior melt-flowability upon molding.

Incidentally, Japanese Patent Application Laid-Open No. 181429/1999 (JP-11-181429) discloses that either a thermoplastic resin (e.g., polyethylene terephthalate, polybutylene terephthalate, polycarbonate) or a thermosetting resin (e.g., phenol resin) is rendered flame-retardant with use of the specific phosphazene compound (e.g., a cyclic phosphazene compound, a linear phosphazene compound, a crosslinked phosphazene compound obtained by crosslinking the cyclic and/or the linear phosphazene compound with the specific group) as a flame retardant. However, in case of rendering a polyethylene terephthalate or a polybutylene terephthalate flame-retardant, the phosphazene compound alone can not sufficiently impart the flame-retardancy to the resin.

Accordingly, it is object of the present invention to provide a resin composition having a high flame-retardancy without deteriorating the properties of polyalkylene terephthalate-series resin.

DISCLOSURE OF INVENTION

The inventors of the present invention did intensive research, and finally found that a polyalkylene terephthalate-series resin can be rendered highly flame-retardant without deteriorating mechanical properties with use of a flame retardant comprising a phenoxyphosphazene compound and a phenolic resin in combination. The present invention was accomplished based on the above findings.

That is, the flame-retardant resin composition comprises a flame retardant comprising a phosphazene compound and a phenolic resin, and a polyalkylene terephthalate-series resin (e.g., polyethylene terephthalate-series resin, polybutylene terephthalate-series resin). The phosphazene compound comprises (1) a cyclic phenoxyphosphazene compound, (2) a linear phenoxyphosphazene compound, or (3) a crosslinked phenoxyphosphazene compound which are shown below.

(1) a cyclic phenoxyphosphazene compound of the formula:

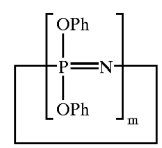

(1)

wherein m is an integer of 3 to 25, and Ph denotes a phenyl group, (2) a linear phenoxyphosphazene compound of the formula:

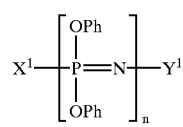

(2)

wherein $X^1$ represents the group —N=P(OPh)$_3$ or the group —N=P(O)OPh; $Y^1$ represents the group —P(OPh)$_4$ or the group —P(O)(OPh)$_2$; n is an integer of 3 to 10,000; and Ph has the same meaning as defined in the formula (1), and (3) a crosslinked phenoxyphosphazene compound which is formed by crosslinking at least one phenoxyphosphazene compound selected from the group consisting of the cyclic phenoxyphosphazene compound (1) and the linear phenoxyphosphazene compound (2) with at least one crosslinking group selected from the group consisting of o-phenylene group, m-phenylene group, p-phenylene group, and a bisphenylene group shown by the formula (3a):

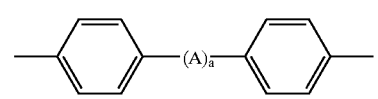

(3a)

wherein A represents —C(CH$_3$)$_2$—, —SO$_2$—, —S— or —O—, and a denotes 0 or 1, and wherein the proportion of the crosslinking group in the crosslinked phenoxyphosphazene compound is, in terms of phenyl group, 0.1 to 50 mol % relative to the total phenyl groups in the phenoxyphosphazene compounds (1) and (2).

The phenolic resin may comprise a phenol-novolak resin, a phenol-aralkyl resin, a polyvinylphenolic resin or the like. The flame retardant may comprise the phosphazene compound and the phenolic resin in the proportion of the former/the latter=5/95 to 95/5 (weight ratio). The amount of the flame retardant may be 1 to 100 parts by weight relative to 100 parts by weight of the polyalkylene terephthalate-series resin. The resin composition may further comprise a nitrogen-containing flame retardant (e.g., a melamine or a derivative thereof, a melamine condensate, a cyanurate of a melamine or a derivative thereof, and a salt of a pyrophosphoric acid or a polyphosphorus acid with a triazine derivative), a phosphate-series flame retardant (e.g., a phosphate, polyphosphate), a carbonizable resin (e.g., a polycarbonate-series resin, a polyarylate-series resin, an aromatic epoxy resin, a polyphenylene oxide-series resin, a polyphenylene sulfide-series resin), an antioxidant, a thermal stabilizer, a drip inhibitor a filler, and the like.

The flame-retardant resin composition can be prepared by mixing a polyalkylene terephthalate-series resin and the flame retardant.

The present invention also includes a molded article formed with the flame-retardant resin composition.

BEST MODE FOR CARRYING OUT THE INVENTION

Polyalkylene Terephthalate-series Resin

The polyalkylene terephthalate-series resin includes a homopolyester or a copolyester containing an alkylene terephthalate as a main component (e.g., about 50 to 100% by weight, preferably about 75 to 100% by weight) The homopolyester includes, for example, poly1, 4-cyclohexane dimethylene terephthalate (PCT), polyethylene terephthalate (PET), polypropylene terephthalate (PPT), polybutylene terephthalate (PBT). A copolymerizable monomer of the copolyester includes, for example, an alcohol component such as (poly)ethylene glycol, (poly)propylene glycol and (poly)butylene glycol, a carboxylic acid component such as adipic acid, sebacic acid, isophthalic acid, naphthalene dicarboxylic acid, biphenylene dicarboxylic acid, hydroxycarboxylic acid, and hydroxynaphthoic acid. These polyalkylene terephthalate can be used singly or in combination. The preferred polyalkylene terephthalate-series resin is polyethylene terephthalate-series resin, polypropylene terephthalate-series resin, and polybutylene terephthalate-series resin, and in particular, a poly$C_{2-4}$alkylene terephthalate such as polyethylene terephthalate and polybutylene terephthalate is preferred.

The number average molecular weight of the polyalkylene terephthalate-series resin is not particularly limited, and can be selected within the range of, for example, about $5 \times 10^3$ to $100 \times 10^4$, preferably about $1 \times 10^4$ to $70 \times 10^4$, more preferably about $1.2 \times 10^4$ to $30 \times 10^4$.

The polyalkylene terephthalate-series resin can be prepared by a conventional method, for example, a transesterification method or a direct esterification method with use of an alkylene glycol and terephthalic acid.

Flame Retardant

The flame retardant of the present invention comprises a phosphazene compound (a cyclic phenoxyphosphazene compound, a linear (or chain) phenoxyphosphazene compound, a crosslinked phenoxyphosphazene compound) and a phenolic resin. The flame-retardant comprises the phosphazene compound and the phenolic resin so that the high flame-retardancy can be imparted to the polyalkylene terephthalate-series resin without deteriorating mechanical properties.

The cyclic phenoxyphosphazene compound includes a compound shown by the following formula (1):

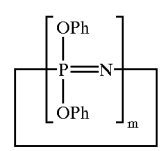

(1)

wherein m is an integer of 3 to 25, and Ph denotes a phenyl group.

The linear phenoxyphosphazene compound includes a compound shown by the formula (2):

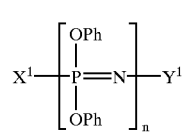

(2)

wherein $X^1$ represents the group —N=P(OPh)$_3$ or the group —N=P(O)OPh; $Y^1$ represents the group —P(OPh)$_4$ or the group P(O)(OPh)$_2$; n is an integer of 3 to 10,000; and Ph has the same meaning as defined in the formula (1).

The crosslinked phenoxyphosphazene compound includes a compound which is formed by crosslinking at least one phenoxyphosphazene compound selected from the group consisting of the cyclic phenoxyphosphazene compound (1) and the linear phenoxyphosphazene compound (2) with a divalent crosslinking group. Incidentally, when a pair of phenoxyphosphazene compounds is crosslinked with the crosslinking group, the divalent crosslinking group is introduced in lieu of a pair of Ph groups.

The divalent crosslinking group includes a phenylene group (o-phenylene group, m-phenylene group, p-phenylene group), and a bisphenylene group shown by the following formula (3a):

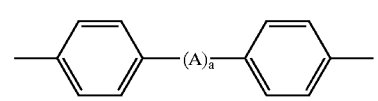

(3a)

wherein A represents —C(CH$_3$)$_2$—, —SO$_2$—, —S— or —O—, and a is 0 or 1.

Incidentally, these crosslinking groups can be used singly or in combination.

The proportion of the crosslinking group in the crosslinked phenoxyphosphazene compound is, in terms of phenyl group, about 0.1 to 50 mol % relative to the total phenyl groups in the phenoxyphosphazene compounds (1) and (2).

Incidentally, it is preferred that the crosslinked phenoxyphosphazene compound does not substantially contain a free hydroxyl group in its molecule.

These phosphazene compounds can be used singly or in combination.

The cyclic and linear phenoxyphosphazene compounds shown by the formulae (1) and (2) can be synthesized by the method described in "Phosphorus-Nitrogen Compounds" by H. R. Allcock, published by Academic Press, (1972), "Inorganic Polymers" by J. E. Mark, H. R. Allcock, R. West, published by Prentice-Hall International, Inc.,(1992).

For example, a mixture of a compound of the formula (1) wherein the group OPh is substituted by a chlorine atom (Cl)

and m is an integer of 3 to 25 (a cyclic dichlorophosphazene oligomer), and a compound of the formula (2) wherein the group OPh is substituted by a chlorine atom and n is an integer of 3 to 25 (a chain dichlorophosphazene oligomer) can be obtained by a reaction of phosphorus chloride (e.g., phosphorus trichloride, phosphorus pentachloride) and ammonium chloride, and if necessary a chlorine (in particular, in case of using phosphorus trichloride as the phosphorus chloride) in a chlorine-series solvent (e.g., chlorobenzene, tetrachloroethane). The cyclic and linear phenoxyphosphazene compounds represented by the formulae (1) and (2) can be obtained by substituting a chlorine atom of the dichlorophosphazene oligomer mixture by phenol with use of an alkali metal phenolate (e.g., sodium phenolate).

The reaction temperature in a reaction of phosphorus chloride and ammonium chloride is, for example, about 120 to 130° C.

If necessary, the mixture of the dichlorophosphazene oligomer may be subjected to purification (e.g., distillation, recrystallization) or polymerization (ring-opening-polymerization of a cyclic dichlorophosphazene oligomer). By purifying the mixture of the dichlorophosphazene oligomer, a single or sole compound of the cyclic dichlorophosphazene (e.g., hexachlorocyclotriphosphazene, octachlorocyclotetraphosphazene, decachlorocyclopentaphosphazene) can be obtained. Therefore, by substituting the single compound with a phenol, the cyclic phenoxyphosphazene compound such as hexaphenoxycyclotriphosphazene, octaphenoxycyclotetraphosphazene, and decaphenoxycyclopentaphosphazene can be obtained.

While, a cyclic dichlorophosphazene oligomer is ring-opening-polymerized to obtain a compound of the formula (2) wherein the group OPh is substituted with a chlorine atom and n is an integer of 3 to 10,000. Therefore, by substituting the compound with a phenol, the linear phenoxyphosphazene compound shown by the formula (2) can be obtained.

The ring-opening-polymerization of the cyclic dichlorophosphazene oligomer can be carried out, for example, by heating to 220 to 250° C.

The crosslinked phenoxyphosphazene compound can be produced by partial-substituting (crosslinking) a chlorine atom with an alkali metal salt of an aromatic dihydroxy compound in lieu of by all-substituting the chlorine atom of the dichlorophosphazene oligomer with an alkali metal salt of phenol in the production process of the cyclic phosphazene compound (1) or the linear phosphazene compound (2).

The dichlorophosphazene oligomer is not particularly limited, and may be used as a mixture of the cyclic dichlorophosphazene oligomer and the linear dichlorophosphazene oligomer or each may be used singly. The reaction order is also not particularly limited. For example, an alkali metal salt of phenol and an alkali metal salt of an aromatic dihydroxy compound may be mixed and subjected to a reaction, or after a reaction with an alkali metal salt of phenol, an alkali metal salt of an aromatic dihydroxy compound may be reacted. Moreover, the reaction may be carried out in its reverse order.

More preferably, a partial-substituted compound in which one part of chlorine atoms of the dichlorophosphazene compound is substituted with a phenol and one part thereof is substituted with an aromatic dihydroxy compound, and one part thereof is retained as chlorine atom, is obtained by reacting the dichlorophosphazene compound (e.g., cyclic dichlorophosphazene oligomer, linear dichlorophosphazene oligomer), an alkali metal salt of a phenol and an alkali metal salt of an aromatic dihydroxy compound (the first stage reaction). Then, the partial-substituted compound is reacted with an alkali metal salt of phenol (the second stage reaction) so that the crosslinked phenoxyphosphazene compound can be obtained. Thus the resulting crosslinked phenoxyphosphazene compound does not substantially contain a free hydroxyl group since all of hydroxyl groups of the aromatic dihydroxy compound are reacted with dichlorophosphazene compounds.

As the aromatic dihydroxy compound, use can be made of a compound having one or not less than two benzene rings in its molecule and two hydroxyl groups, more concretely, a compound having the above crosslinking group (o-phenylene group, m-phenylene group, p-phenylene group, a group shown by the formula (3a)). The preferred aromatic dihydroxy compound includes resorcinol, hydroquinone, catechol, 4,4'-isopropylidenediphenol (bisphenol-A), 4,4'-sulfonyldiphenol (bisphenol-S), 4,4'-thiodiphenol, 4,4'-oxydiphenol, 4,4'-diphenol and the like. The aromatic dihydroxy compound can be used singly or in combination.

The alkali metal constituting the alkali metal salt includes sodium, potassium, lithium and the like, preferably sodium and lithium.

In the first stage reaction, the total amount of an alkali metal salts of phenol and an aromatic dihydroxy compound is usually about 0.05 to 0.9 equivalent, and preferably about 0.1 to 0.8 equivalent based on the chlorine content of the dichlorophosphazene oligomer. When the amount of the alkali metal salt is less than 0.05 equivalent, the degree of crosslinking is insufficient. While, when the amount of the alkali metal salt is more than 0.9 equivalent, a free hydroxyl group (a hydroxyl group at one side of the dihydroxy compound) is introduced into the crosslinked phenoxyphosphazene compound.

The ratio of the alkali metal salt of the aromatic dihydroxy compound to that of phenol is not particularly limited, can be suitably selected within a wide range and is usually the former/the latter=about 1/2000 to 1/4 (molar ratio). When the ratio is remarkably less than 1/2000, the degree of crosslinking is insufficient. While, when the ratio is dramatically more than 1/4, the crosslink proceeds too much, so that the solubility and meltability of the crosslinked phenoxyphosphazene compound are deteriorated and the dispersability in a resin is inadequate.

The first and second stage reactions may be carried out in a solvent (an aromatic hydrocarbon such as benzene, toluene, xylene, a halogenated aromatic hydrocarbon such as chlorobenzene).

Moreover, the reaction temperature is usually from a room temperature (e.g., about 15 to 30° C.) to about 150° C.

In the second stage reaction, the amount of the alkali metal salt of phenol is usually about 1 to 1.5 equivalents, preferably about 1 to 1.2 equivalents based on the chlorine content of dichlorophosphazene oligomer.

The proportion of the phosphazene compound is, for example, about 1 to 40 parts by weight, preferably about 1 to 30 parts by weight, more preferably about 5 to 25 parts by weight relative to 100 parts by weight of the polyalkylene terephthalate-series resin.

As the phenolic resin, a variety of resins having a phenol residue as a constituting unit can be used and include for example, novolak resins, aralkyl resins, polyvinylphenol-series resins.

The novolak resin includes phenol-novolak resin obtained by a reaction (condensation reaction) of a phenol (e.g., phenol, a phenol substituted with a $C_{1-10}$ alkyl group such as cresol, ethylphenol, propylphenol, butylphenol, octylphenol; cyanophenol) and an aldehyde (e.g., formaldehyde, acetaldehyde, propionaldehyde, in particular, formaldehyde).

The condensation reaction of the phenol and the aldehyde may be carried out in the presence of an acid catalyst such as an inorganic acid (e.g., hydrocholoric acid, sulfuric acid) and an organic acid (e.g., p-toluenesulfonic acid, oxalic acid) and may be carried out in the absence of a catalyst. The ratio of phenol to aldehyde is the former/the latter=about 1/0.6 to 1/1 (molar ratio).

The phenol novolak resin also includes a random phenol-novolak resin which has random methylene bond to a phenolic hydroxyl group, high-ortho phenol-novolak resin which has many methylene bonds at ortho position of a phenolic hydroxyl group (e.g., a resin having the ratio ortho/para of not less than 1), a triazine-modified or triazine-containing phenol-novolak resin which is modified with a triazine (e.g., melamine, benzoguanamine), (for example, those obtained by copolycondensation of a triazine and a phenol-novolak resin). A phenol-novolak resin containing a free monomer component and a dimer component in small amounts [e.g., a resin in which the total amount of a free monomer component and dimer components is, relative to a whole resin, not more than 20% by weight (e.g., about 0 to 20% by weight), preferably not more than 10% by weight (e.g., about 0 to 10% by weight), more preferably 5% by weight (e g., about 0 to 5% by weight)] is preferred.

The aralkyl resin includes a phenol-aralkyl resin obtained by a reaction of the phenol exemplified in item of the novolak resin with an aralkyl compound (a reactive compound having a xylylene unit, for example, a xylylene glycol or a derivative thereof such as p-xylylene glycol, and α,α'-dimethoxy-p-xylene; α,α'-dihalo-p-xylene such as α,α'-dichloro-p-xylene).

The polyvinylphenol-series resin includes a homopolymer of a vinyl phenol, a copolymer of a vinyl phenol with the other copolymerizable monomers [for example, a styrene such as styrene, vinyl toluene and α-methylstyrene; a (meth)acrylic acid or a derivative thereof (e.g., an ester, an acid amide) such as (meth)acrylic acid and (meth)acrylate, (meth)acrylonitrile].

The phenolic resin can be used singly or in combination. The preferred phenolic resin is a phenol-novolak resin, a phenol-aralkyl resin, a homo- or copolymer of a vinyl phenol.

Incidentally, a part or all of the phenolic hydroxyl groups of the phenolic resin may be optionally modified with boric acid, borate, phosphoric acid, phosphate or the like.

The number average molecular weight of the phenolic resin is not particularly limited and can be selected within the range of about 300 to $5 \times 10^4$, preferably about 300 to $1 \times 10^4$, and more preferably about 300 to 8,000.

The ratio of the phenolic resin used in the flame retardants is, for example, about 1 to 40 parts by weight, preferably about 1 to 30 parts by weight, more preferably about 3 to 25 parts by weight (in particular, about 5 to 20 parts by weight) relative to 100 parts by weight of polyalkylene terephthalate-series resin.

Moreover, the ratio of the phosphazene compound to the phenolic resin in the flame retardant is, for example, the former/the latter=about 5/95 to 95/5 (weight ratio), preferably about 20/80 to 80/20 (weight ratio), more preferably about 30/70 to 70/30 (weight ratio).

Since the flame retardant of the present invention has a phenolic resin, the flame-retardancy can be imparted to the polyalkylene terephthalate-series resin with inhibiting the decline in a molecular weight and a mechanical property (e.g., strength, impact resistance) of the polyalkylene terephthalate-series resin. In particular, the phosphazene compound is combined with the phenolic resin so that the polyalkylene terephthalate-series resin is provided with higher flame-retardant compared to the case of using the phosphazene compound singly. Moreover, since the flame retardant does not contain a halogen, there is no possibility that a hydrogen halide which is poisonous gas generates upon decomposition and burning, and that corrosion of a mould and deterioration of a resin occur upon molding the resin.

The proportion of the flame retardant in the resin composition is not particularly limited as far as the property of the polyalkylene terephthalate-series resin is not deteriorated and is about 1 to 100 parts by weight, preferably about 5 to 90 parts by weight (e.g., about 5 to 80 parts by weight), more preferably about 10 to 80 parts by weight (e.g., about 20 to 60 parts by weight) relative to 100 parts by weight of the polyalkylene terephthalate-series resin. When the amount of the flame retardant is less than 1 part by weight, it is difficult that the flame-retardancy is imparted. When the amount of the flame retardant is more than 100 parts by weight, the mechanical strength and moldability of a molded article obtained from the resin composition are deteriorated.

The polyalkylene terephthalate-series resin composition of the present invention may optionally contain other flame retardants, carbonizable resins, additives [for example, a drip inhibiter, an antioxidant, an stabilizer (e.g., thermal stabilizer)]. The content of other flame retardants is about 0 to 50 parts by weight, preferably about 1 to 30 parts by weight, more preferably about 3 to 20 parts by weight relative to 100 parts by weight of the polyalkylene terephthalate-series resin. Moreover, the content of the carbonizable resin is about 0 to 100 parts by weight, preferably about 1 to 80 parts by weight, more preferably about 10 to 60 parts by weight relative to 100 parts by weight of the polyalkylene terephthalate-series resin. The content of the additives is about 0.01 to 20 parts by weight, preferably about 0.1 to 10 parts by weight relative to 100 parts by weight of the polyalkylene terephthalate-series resin.

As the other flame retardants, there may be mentioned a nitrogen-containing flame retardant [e.g., an aminotriazine such as melamine and guanamine; a melamine condensate such as melam and melem; cyanurate of an aminotriazine such as melamine cyanurate and guanamine cyanurate; a salt of pyrophosphoric acid or polyphosphoric acid with a triazine derivative such as melamine salt, melam salt, melem salt, melamine-melam-melem complex salt], an organic phosphorus-series flame retardant [a phosphate-series flame retardant, for example, a phosphate (e.g., triphenyl phosphate, tricresyl phosphate); polyphosphate (polyphosphate having an aromatic ring such as hydroquinone bis(diphenyl phosphate), hydroquinone bis(dicresyl phosphate), hydroquinone bis(dixylyl phosphate), diphenol bis(dixylyl phosphate), resorcinol bis(diphenyl phosphate), resorcinol bis(dicresyl phosphate), resorcinol bis(dixylyl phosphate), bisphenol-A bis(diphenyl phosphate), bisphenol-A bis(dicresyl phosphate), and bisphenol-A bis(dixylyl phosphate)], an inorganic phosphorus-series flame retardant (e.g., a red-phosphorus which may be coated with a resin, phosphoric acid salt), a sulfur-containing flame retardant, a silicon-containing flame retardant (e.g., (poly)organosiloxane), a boron-containing flame retardant (e.g., hydrated zinc borate), an inorganic flame retardant (e.g., metal oxide, metal hydroxide). Such other flame retardants can be used singly or in combination.

The carbonizable resin includes a resin having an aromatic ring. As such the aromatic ring-containing resin, there may be exemplified a polycarbonate-series resin, a polyarylate-series resin, an aromatic epoxy resin (e.g., a bisphenol-A-type epoxy resin, a novolak-type epoxy resin, a phenoxy resin), a polyphenylene oxide-series resin, a polyphenylene sulfide-series resin. These carbonizable resins can be used singly or in combination.

The other flame retardants (the nitrogen-containing flame retardant, phosphate-series flame retardant) and/or the carbonizable resin are used in combination so that the flame-retardancy of the polyalkylene terephthalate-series resin can be further improved.

The drip inhibitor includes a fluororesin such as a homo- or copolymer of a fluorine-containing monomer and a copolymer of the fluorine-containing monomer with the other copolymerizable monomer, a layered silicate. As the fluororesin, there may be mentioned polytetrafluoroethylene, polychlorotrifluoroethylene, polyvinylidene fluoride, tetrafluoroethylene-hexafluoropropylene copolymer, tetrafluoroethylene-perfluoroalkylvinylether copolymer, ethylene-tetrafluoroethylene copolymer, ethylene-chlorotrifluoroethylene copolymer and the like.

As the antioxidant, there may be mentioned, for example, hindered phenol-series antioxidants (e.g., 2,6-di-t-butyl-p-cresol, 2,2'-methylenebis(4-methyl-6-t-butylphenol), 2,2'-thiobis(4-methyl-6-t-butylphenol), 4,4'-thiobis(6-t-butyl-m-cresol), and pentaerythritoltetrakis[3-(3,5-di-t-butyl-4-hydroxyphenyl)propionate]), amine-series antioxidants (e.g., naphthylamine), phosphorus-series antioxidants (e.g., a phosphate such as bis(2,4-di-t-butylphenyl) pentaerythritol diphosphite, and bis(2,6-di-t-butyl-4-methylphenyl) pentaerythritol diphosphite, a phosphonite such as tetrakis(2,4-di-t-butylphenyl)-4,4'-biphenylenediphosphonite).

As the thermal stabilizers, there may be mentioned an inorganic phosphorus-series stabilizer, for example, phosphoric acid, phosphonic acid, pyrophosphoric acid, tripolyphosphoric acid, a primary phosphate with an alkali metal, a primary phosphate with an alkali metal (e.g., sodium primary phosphate), a primary phosphate with an alkaline earth metal (e.g., calcium primary phosphate) and the like.

Moreover, the resin composition of the present invention may optionally contain the other additives such as a lubricant, a plasticizer, a flame-retardant auxiliary, an ultra-violet ray absorbing agent, a pigment, a dye, an antistatic agent, a dispersing agent, a compatibilizer, an antibacterial agent and the like.

Further, the resin composition may optionally contain a filler (e.g., kaolin, mica, talc, calcium carbonate, titanium oxide, glass fiber, glass flake, glass bead, milled fiber, various metal foils, carbon fiber).

When the filler is used, the amount of the filler in the flame-retardant resin composition is, for example, about 1 to 60% by weight, preferably about 5 to 50% by weight, more preferably about 5 to 45% by weight.

Moreover, when the filler is used, a sizing agent or a surface-treatment agent may be optionally used. Such a sizing agent or surface-treatment agent includes a functional compound. The above functional compound includes, for example, an epoxy-containing compound, silane-containing compound, titanate-series compound.

The resin composition of the present invention may be whichever a powdered mixture or a melt mixture, and can be prepared by mixing the polyalkylene terephthalate-series resin, the above specific flame retardant, and optionally the other flame retardants, carbonizable resins, additives by means of a conventional method.

The resin composition of the present invention can be melt-kneaded and molded by a conventional method such as extrusion molding, injection molding, and compression molding. Since the molded article which is formed is superior in a flame-retardancy and mold-processability, the article can be utilized in a variety of applications. For example, the article is favorable for use in electric or electronic device parts, mechanical device parts and automotive parts.

Industrial Applicability

According to the present invention, since the flame retardant comprising the specific phosphazene compound and the phenolic resin in combination is used, it is made possible to give high flame-retardancy to the polyalkylene terephthalate-series resin without using a halogen-containing flame retardant. In particular, according to the present invention, it is also possible to make the polyalkylene terephthalate-series resin highly flame-retardant without adversely affecting its inherent characteristics even after imparting the flame-retardancy.

EXAMPLES

The following examples are intended to describe this invention in further detail and should by no means be interpreted as defining the scope of the invention.

In Examples and Comparative Examples, a polyalkylene terephthalate-series resin, a flame retardant (phosphazene compound, phenolic resin), and optionally the other flame retardant, a carbonizable resin, an additive (antioxidant, thermal stabilizer, drip inhibiter), and a filler, which are shown below were used.

Polyalkylene Terephthalate A
  A-1: polybutylene terephthalate [Duranex, intrinsic viscosity 1.0, manufactured by Polyplastics, Co. Ltd.]
  A-2: polybutylene terephthalate [Duranex, intrinsic viscosity 0.75, manufactured by Polyplastics, Co. Ltd.]
  A-3: polyethylene terephthalate (manufactured by BelPet EFG10, Kanebo, Ltd.)

Phosphazene Compound B
  B-1 to B-5: phenoxyphosphazene compounds obtained by the following synthesis examples 1 to 5.

Phenolic Resin C
  C-1: novolak resin [Tamanol 759, manufactured by Arakawa Chemical Industries, Ltd.]
  C-2: novolak resin [Sumilite Resin PR-53195 (free monomer component: 0.3% by weight, dimer component: 17% by weight ), manufactured by Sumitomo Durez Co., Ltd.]
  C-3: novlak resin [Sumilite resin PR-53647 (free monomer component: 0.03% by weight, dimer component: 1.6% by weight), Sumitomo Durez, Co., Ltd.]
  C-4: phenol aralkyl resin [Milex XL-225, manufactured by Mitsui Chemicals, Inc.]
  C-5: polyvinyl phenol [Maruka Lyncur-MS-1P, manufactured by Maruzen Petrochemical Co., Ltd.]
  C-6: novolak resin
    After reacting 500 parts by weight of phenol, 225 parts by weight of 37% formaline and 5 parts by weight of oxalic acid for 3 hours with refluxing, the distillation was carried out under an ambient pressure and under reduced pressure to obtain 350 parts by weight of novolak-type phenol resin. The resulting resin was determined by GPC, and as a result, amounts of a free monomer component and a dimer component were 0.3% by weight and 21% by weight, respectively.

The Other Flame Retardant D
  D-1: melamine cyanurate [MC610, manufactured by Nissan Chemical Industries, Ltd.]
  D-2: resorcinol bis(dixylyl phosphate)[PX200, manufactured by Daihachi Chemical Industry. Co. Ltd.]
  D-3: melam polyphosphate [PMP200, manufactured by Nissan Chemical Industries, Co. Ltd.]
Carbonizable Resin E
  E-1: polycarbonate [Panlite L1225, manufactured by Teijin Chemicals, Ltd.]
  E-2: bisphenol A-type epoxy resin [Epikote 1004K, manufactured by Yuka Shell Epoxy K.K.]
Antioxidant/Thermal Stabilizer F
  F-1: pentaerythritol tetrakis[3-(3,5-di-t-butyl-4-hydroxyphenyl)propionate] [Irganox 1010, manufactured by Ciba-Geigy Ltd.]
  F-2: bis(2,6-di-t-butyl-4-methylphenyl)pentaerythritol diphosphite [Adekastab PEP36, manufactured by Asahi Denka Kogyo K.K.]
  F-3: tetrakis(2,4-di-t-butylphenyl)-4,4'-bephenylenediphosphonite [Sandostab P-EPQ, manufactured by Sandoz.]
  F-4: calcium primary phosphate
Drip Inhibitor G
  G-1: polytetrafluoroethylene
Filler H
  H-1: glass fiber (diameter: 13 μm, chopped strand of 3 mm length)
  H-2: glass fiber (diameter: 10 μm, chopped strand of 3 mm length)

Synthesis Example 1

Synthesis of a Cyclic Phenoxyphosphazene Compound (B-1)

Reference; H. R. Allcock, "Phosphorus-Nitrogen Compounds", Academic Press, (1972)

To 580 g of chlorobenzene solution (20% by weight) containing 1.0 unit mol (115.9 g) of dichlorophosphazene oligomer (a mixture of 62% by weight of a trimer and 38% by weight of a tetramer) was added a toluene solution containing sodium phenolate with stirring, and reacted for 4 hours at 110° C. to obtain a cyclic phenoxyphosphazene compound. The amount of chlorine formed by hydrolysis after purification was 0.08% by weight.

Synthesis Example 2

Synthesis of a Phenoxyphosphazene Compound (B-2)

To a four neck flask (1L) equipped with a stirrer, a thermometer, and a reflux condenser were added 1.3 mol (123.0 g) of phenol and 500 mL of tetrahydrofuran to dissolve homogeneously. Then, 27.6 g of metal sodium was added at 25° C. or less, and after adding, stirred for 6 hours at 61 to 68° C. to prepare a sodium phenolate solution.

To a four neck flask (2L) charged with 290 g of a chlorobenzene solution (20% by weight) containing 0.5 unit mol (58 g) of dichlorophosphazene oligomer (a mixture of 59% by weight of trimer, 12% by weight of tetramer, 11% by weight of pentamer and hexamer, 3% by weight of heptamer and 15% by weight of oligomers having eight or more repeating units) was added dropwise the sodium phenolate solution with stirring at 25° C. or less. After adding dropwise, the reaction was carried out with stirring for 15 hours at 71 to 73° C. After the completion of the reaction, the reaction mixture was condensed and redissolved in 500 mL of chlorobenzene, washed three times with 5% by weight of NaOH aqueous solution, washed with 5% by weight of sulfuric acid, washed with 5% by weight of sodium hydrogencarbonate aqueous solution, washed twice with water and condensed to dryness to obtain 108 g of a light yellow wax-like material.

The product was analyzed by GPC, and as a result, the weight-average molecular weight (Mw) was 810 in terms of polystyrene. The product was analyzed by TG/DTA, and as a result, the melting temperature was 103° C., the beginning temperature of decomposition was 330° C., and the 5% by weight loss temperature was 347° C. Moreover, the amount of the residual chlorine (chlorine formed by hydrolysis: Hy-Cl) was 0.09% by weight, and by the elemental analysis of phosphorus and CHN, it was determined that the product was the following compound: $[N=P(-OPh)_2]_n$ Synthesis Example 3

Synthesis of a Phenoxyphosphazene Compound Having a Crosslinking Structure with m-phenylene (B-3)

The mixture of 1.1 mol (103.5 g) of phenol, 1.1 mol (44.0 g) of sodium hydroxide, 50 g of water and 500 mL of toluene was heated with refluxing and water was exclusively removed from the system to prepare a toluene solution containing sodium phenolate.

Parallel to the reaction, the mixture of 0.15 mol of (16.5 g) of resorcinol, 1.0 mol (94.1 g) of phenol, 1.3 mol (31.1 g) of lithium hydroxide, 52 g of water and 600 mL of toluene was heated with refluxing in a four neck flask (2L) and water was exclusively removed from the system to prepare a toluene solution containing resorcinol and lithium salt of phenol. To this toluene solution were added dropwise 580 g of a chlorobenzene solution (20% by weight) containing 1.0 unit mol (115.9 g) of dichlorophosphazene oligomer (62% by weight of trimer, 12% by weight of tetramer, 11% by weight of pentamer and hexamer, 3% by weight of heptamer, 12% by weight of oligomers having eight or more repeating units) at 30° C. or less with stirring, and a reaction was carried out for 3 hours at 110° C. with stirring. To the reaction mixture was added the toluene solution containing sodium phenolate and the reaction was continued for 4 hours at 110° C.

After the completion of the reaction, the reaction mixture was washed three times with 3% by weight of sodium hydroxide aqueous solution (1.0 L), then washed three times with 1.0 L of water, and the organic layer was concentrated under reduced pressure. The resulting product was heated and vacuum dried for 11 hours at 80° C. and 400 Pa or less to obtain 209 g of a white powder.

In the resulting crosslinked phenoxyphosphazene compound, the chlorine amount formed by hydrolysis was 0.08% by weight, the weight-average molecular weight (MW) was 1080 in terms of polystyrene (determined by GPC analysis), and it was determined by the phosphorus content and the value of CHN elemental analysis that the composition of the final product was $[N=(-O-m-Ph-O-)_{0.15}(-O-Ph)_{1.7}]$. TG/DTA analysis was carried out, and as a result, the melting point was unclear, the beginning temperature of decomposition was 304° C., and 5% by weight loss temperature was 311° C. Moreover, the amount of the residual hydroxyl group was determined by an acetylation method, and as a result, the amount was below detection limits (a hydroxy equivalent per 1 g of a sample: $1\times10^{-6}$ equivalent/g or less).

Synthesis Example 4

Synthesis of a Phenoxyphosphazene Compound Having a Crosslinking Structure with 2,2-bis(p-oxyphenyl)isopopylidene Group (B-4)

To a four neck flask (1L) containing 0.7 mol (65.9 g) of phenol and 500 mL of toluene was added 0.65 gram atom (14.9 g) of a subdivided metal sodium with maintaining the inner liquid temperature at 25° C. and with stirring. After adding, the mixture was stirred for 8 hours at a temperature of 77 to 113° C. until the metal sodium disappeared completely.

Parallel to the reaction, to a four neck flask (3L) charged with 0.25 mol(57.1 g)of bisphenol A, 1.1 mol (103.5 g) of phenol and 800 mL of tetrahydrofuran (THF) was added 1.6 gram atom (11.1 g) of a subdivided metal lithium with maintaining the inner liquid temperature at 25° C. or less and with stirring. After adding, the mixture was stirred for 8 hours at a temperature of 61 to 68° C. until the metal lithium disappeared completely. To the slurry solution was added dropwise 1.0 unit mol (115.9 g) of dichlorophosphazene oligomer (concentration 37% by weight, chlorobenzene solution 313 g, composition: 75% by weight of trimer, 17% by weight of tetramer, 6% by weight of pentamer and hexamer, 1% by weight of heptamer, 1% by weight of oligomers having eight or more repeating units) over 1 hour with maintaining the inner liquid temperature at 20° C. or less and with stirring, and the reaction was carried out for 2 hours at 80° C. Then, with stirring and with maintaining the inner liquid temperature at 20° C., the sodium phenolate solution prepared separately was added over 1 hour, and the reaction was carried out at 80° C. for 5 hours.

After completion of the reaction, the reaction mixture was concentrated to remove off THF, and 1L of toluene was further added. The toluene solution was washed three times with 1 L of NaOH aqueous solution (2% by weight), then washed three times with 1.0 L of water, and the organic layer was concentrated under reduced pressure. The resulting product was heated and vacuum dried for 11 hours at 80° C. and 400 Pa or less to obtain 229 g of white powder.

In the resulting crosslinked phenoxyphosphazene compound, a chlorine amount formed by hydrolysis was 0.07% by weight, and it was determined by the phosphorus content and the value of CHN elemental analysis that the final product was $[N=P(-O-Ph-C(CH_3)_2-Ph-O-)_{0.25}(-O-Ph)_{1.50}]$. The weight-average molecular weight (MW) was 1130 in terms of polystyrene (determined by GPC analysis). TG/DTA analysis was carried out, and as a result, the melting point was unclear, the beginning temperature of decomposition was 308° C., and 5% by weight loss temperature was 313° C. Moreover, the amount of the residual hydroxyl group was determined by an acetylation method, and as a result, the amount was below detection limits (a hydroxy equivalent per 1 g of a sample: $1\times10^{-6}$ equivalent/g or less).

Synthesis Example 5

Synthesis of a Phenoxyphosphazene Compound Having a Crosslink Structure with 4,4'-sulfonyldiphenylene(bisphenol-S residue) (B-5)

To a four neck flask (1L) charged with 0.4 mol (37.6 g) of phenol and 500 mL of THF was added 0.4 gram atom (9.2 g) of a subdivided metal sodium with maintaining the inner liquid temperature at 25° C. and with stirring. After adding, the mixture was stirred for 5 hours at a temperature of 65 to 72° C. until the metal sodium disappeared completely.

Parallel to the reaction, to a four neck flask (1L) charged with 500 mL of tetrahydrofuran (THF) solution containing 1.70 mol (160.0 g) of phenol and 0.05 mol (12.5 g) of bisphenol-S was added 1.8 gram atom (41.4 g) of a metal sodium at 25° C. or less with stirring. After adding, the temperature was elevated to 61° C. over 1 hour and the mixture was stirred for 6 hours at a temperature of 61 to 68° C. to prepare a mixture solution of sodium phenolate. This solution was added dropwise to 580 g of chlorobenzene solution (20% by weight) containing 1.0 unit mol (115.9 g) of dichlorophosphazene oligomer (a mixture of 62% by weight of trimer, 12% by weight of tetramer, 11% by weight of pentamer and hexamer, 3% by weight of heptamer, 12% by weight of oligomers having eight or more repeating units) with stirring and with cooling to 25° C. or less, and the reaction was carried out for 5 hours at 71 to 73° C. with stirring. Then, the sodium phenolate mixture solution prepared separately was added dropwise, and the reaction was carried out at 71 to 73° C. for 3 hours.

After completion of the reaction, the reaction mixture was concentrated, redissolved in 500 mL of chlorobenzene, washed three times with 5% by weight of NaOH aqueous solution, washed with 5% by weight of sulfuric acid, washed with 5% by weight of sodium hydrogencarbonate, washed three times with water, and concentrated to dryness to obtain 218 g of light yellow wax-like material.

In the resulting crosslinked phenoxyphosphazene compound, a chlorine amount formed by hydrolysis was 0.01% by weight or less, and it was determined by the phosphorus content and the value of CHN elemental analysis that the product was roughly $[N=P(-O-Ph-SO_2-Ph-O-)_{0.05}(-O-Ph)_{1.90}]$. The weight-average molecular weight (MW) was 1080 in terms of polystyrene (determined by GPC analysis). TG/DTA analysis was carried out, and as a result, the melting point was 103° C., the beginning temperature of decomposition was 320° C., and 5% by weight loss temperature was 334° C. Moreover, the amount of the residual hydroxyl group was determined by an acetylation method, and as a result, the amount was below detection limits (a hydroxy equivalent per 1 g of a sample: $1\times10^{-6}$ equivalent/g or less).

Examples 1 to 15 and Comparative Examples 1 to 11

Into polyalkylene terephthalate A were mixed phosphazene compound B, phenolic resin C, the other flame retardant D, carbonizable resin E, antioxidant/thermal stabilizer F, drip inhibitor G, filler H and so on in the proportion shown by the Tables 1 and 2, and the mixture was kneaded at 240° C. (in case of Examples 1 to 6, 8 to 9, 13 to 15, and Comparative Examples 1 to 8 and 10) or 270° C. (in case of Example 7 and Comparative Example 9 adding polycarbonate; Examples 10 to 12 and Comparative Example 11 adding polyethylene terephthalate) for 5 minutes with the use of LABOPLASTMILL (manufactured by Toyo Seiki Seisakusho, Ltd.) to obtain a composition. The polyalkylene terephthalate-series resin composition was injection molded with a small-size molding machine and to prepare a molded article for flame retardancy test (77 mm×9.5 mm×3 mm). The flame retardancy of the molded article was evaluated according to UL 94.

The results are shown by Tables 1 to 4.

TABLE 1

|  | Ex.1 | Ex.2 | Ex.3 | Ex.4 | Ex.5 | Ex.6 |
|---|---|---|---|---|---|---|
| polyalkylene terephthalate resin A | A-1 | A-1 | A-1 | A-1 | A-1 | A-1 |
| (parts by weight) | 100 | 100 | 100 | 100 | 100 | 100 |
| phosphazene compound B | B-1 | B-2 | B-3 | B-4 | B-5 | B-5 |
| (parts by weight) | 20 | 15 | 15 | 15 | 20 | 15 |
| phenolic resin C | C-1 | C-1 | C-2 | C-2 | C-2 | C-2 |
| (parts by weight) | 15 | 15 | 15 | 15 | 15 | 15 |
| the other flame retardant D | — | D-1 | D-1 | D-1 | — | D-1 |
| (parts by weight) |  | 7 | 7 | 7 |  | 7 |
| carbonizable resin E | — | — | — | — | — | — |
| (parts by weight) |  |  |  |  |  |  |
| antioxidant/thermal stabilizer F | F-1 | F-1  F-2 | F-1  F-3 | F-1  F-3 | F-1  F-2 | F-1  F-3 |
| (parts by weight) | 0.15 | 0.15  0.15 | 0.15  0.15 | 0.15  0.15 | 0.15  0.15 | 0.15  0.15 |
| drip inhibitor G | G-1 | G-1 | G-1 | G-1 | G-1 | G-1 |
| (parts by weight) | 0.7 | 0.7 | 0.7 | 0.7 | 0.7 | 0.7 |
| filler H | — | — | — | — | — | — |
| (parts by weight) |  |  |  |  |  |  |
| flame retardancy UL94 | V-1 | V-0 | V-0 | V-0 | V-1 | V-0 |

TABLE 2

|  | Ex.7 | Ex.8 | Ex.9 | Ex.10 | Ex.11 | Ex.12 | Ex.13 | Ex.14 | Ex.15 |
|---|---|---|---|---|---|---|---|---|---|
| polyalkylene terephthalate resin A | A-1 | A-2 | A-2 | A-3 | A-1  A-3 | A-2  A-3 | A-2 | A-2 | A-2 |
| (parts by weight) | 100 | 100 | 100 | 100 | 70  30 | 70  30 | 100 | 100 | 100 |
| phosphazene compound B | B-5 | B-3 | B-5 | B-3 | B-5 | B-5 | B-5 | B-5 | B-5 |
| (parts by weight) | 20 | 20 | 20 | 15 | 15 | 20 | 10 | 20 | 20 |
| phenolic resin C | C-2 | C-2 | C-2 | C-2 | C-2 | C-2 | C-3 | C-4 | C-5 |
| (parts by weight) | 10 | 20 | 20 | 15 | 15 | 20 | 20 | 15 | 20 |
| the other flame retardant D | D-1 | D-1 | D-1 | D-1 | D-1 | D-1 | D-1  D-2 | D-3 | D-1 |
| (parts by weight) | 10 | 10 | 10 | 7 | 7 | 10 | 10  10 | 10 | 10 |
| carbonizable resin E | E-1 | — | — | — | — | — | — | E-2 | — |
| (parts by weight) | 30 |  |  |  |  |  |  | 5 |  |
| antioxidant/thermal stabilizer F | F-1  F-3 | F-1  F-3 | F-1  F-3 | F-1  F-3 | F-1  F-3 | F-1  F-3 | F-1 | F-1 | F-1 |
| (parts by weight) | 0.2  0.2 | 0.2  0.2 | 0.2  0.2 | 0.2  0.2 | 0.15  0.15 | 0.2  0.2 | 0.2 | 0.2 | 0.2 |
| drip inhibitor G | G-1 | G-1 | G-1 | G-1 | G-1 | G-1 | — | G-1 | G-1 |
| (parts by weight) | 1.0 | 1.0 | 1.0 | 1.0 | 1.0 | 1.0 |  | 1.0 | 1.0 |
| filler H | — | H-1 | H-1 | — | — | H-1 | H-1 | H-1 | H-1 |
| (parts by weight) |  | 65 | 65 |  |  | 65 | 65 | 65 | 65 |
| flame retardancy UL94 | V-0 | V-0 | V-0 | V-0 | V-0 | V-0 | V-0 | V-0 | V-0 |

TABLE 3

|  | Comp.Ex.1 | Comp.Ex.2 | Comp.Ex.3 | Comp.Ex.4 | Comp.Ex.5 | Comp.Ex.6 |
|---|---|---|---|---|---|---|
| polyalkylene terephthalate resin A | A-1 | A-1 | A-1 | A-1 | A-1 | A-1 |
| (parts by weight) | 100 | 100 | 100 | 100 | 100 | 100 |
| phosphazene compound B | — | B-1 | B-2 | B-3 | B-4 | B-5 |
| (parts by weight) |  | 15 | 15 | 15 | 15 | 15 |
| phenolic resin C | — | — | — | — | — | — |
| (parts by weight) |  |  |  |  |  |  |
| the other flame retardant D | — | — | — | — | — | — |
| (parts by weight) |  |  |  |  |  |  |
| carbonizable resin E | — | — | — | — | — | — |
| (parts by weight) |  |  |  |  |  |  |
| antioxidant/thermal stabilizer F | F-1 | F-1 | F-1  F-2 | F-1  F-3 | F-1  F-3 | F-1  F-3 |
| (parts by weight) | 0.15 | 0.15 | 0.15  0.15 | 0.15  0.15 | 0.15  0.15 | 0.15  0.15 |
| drip inhibitor G | G-1 | G-1 | G-1 | G-1 | G-1 | G-1 |
| (parts by weight) | 0.7 | 0.7 | 0.7 | 0.7 | 0.7 | 0.7 |
| filler H | — | — | — | — | — | — |
| (parts by weight) |  |  |  |  |  |  |
| flame retardancy UL94 | below HB | below HB | below HB | below HB | below HB | below HB |

TABLE 4

|  | Comp.Ex.7 | Comp.Ex.8 | Comp.Ex.9 | Comp.Ex.10 | Comp.Ex.11 |
|---|---|---|---|---|---|
| polyalkylene terephthalate resin A | A-1 | A-1 | A-1 | A-2 | A-3 |
| (parts by weight) | 100 | 100 | 100 | 100 | 100 |
| phosphazene compound B | — | — | — | — | — |
| (parts by weight) |  |  |  |  |  |

TABLE 4-continued

|  | Comp.Ex.7 | Comp.Ex.8 | Comp.Ex.9 | Comp.Ex.10 | Comp.Ex.11 |
|---|---|---|---|---|---|
| phenolic resin C | C-2 | C-2 | C-2 | C-2 | C-2 |
| (parts by weight) | 15 | 15 | 10 | 20 | 15 |
| the other flame retardant D | — | D-1 | D-1 | D-1 | D-1 |
| (parts by weight) |  | 7 | 10 | 10 | 7 |
| carbonizable resin E | — | — | E-1 | — | — |
| (parts by weight) |  |  | 30 |  |  |
| antioxidant/thermal stabilizer F | F-1  F-3 | F-1  F-3 | F-1  F-3 | F-1  F-3 | F-1  F-3 |
| (parts by weight) | 0.15  0.15 | 0.15  0.15 | 0.2  0.2 | 0.2  0.2 | 0.2  0.2 |
| drip inhibitor G | G-1 | G-1 | G-1 | G-1 | G-1 |
| (parts by weight) | 1.0 | 1.0 | 1.0 | 1.0 | 1.0 |
| filler H | — | — | — | H-1 | — |
| (parts by weight) |  |  |  | 65 |  |
| flame retardancy UL94 | below HB | below HB | below HB | below HB | below HB |

As apparent from Tables 1 to 4, polyalkylene terephthalates of Examples are remarkably improved in flame retardancy.

Examples 16 to 19 and Comparative Example 12

To polyalkylene terephthalate A was mixed phosphazene compound B, phenolic resin C, the other flame retardant D, carbonizable resin E, antioxidant/thermal stabilizer F, drip inhibitor G, and filler H in the proportion shown by Table 5, and extruded with a biaxially extruder (30φ, The Japan Steel Works, Ltd., TEX30) to prepare a pellet-like composition. Then, using a molding machine having a force of 80 ton, shaped articles for tests were made and the flame retardancy, a property (tensile property), and an odor during molding were evaluated according to the following methods.

Flame Retardancy

The flame retardancy was evaluated in accordance with UL-94 using a test piece having a thickness of 1.6 mm.

Tensile Property

In accordance with ASTM D-790, the bending or flexural strength was determined with use of a test piece obtained by injection molding.

Odor Level During Molding

The odor level was evaluated according to the following three-grade schedule.

○: no odor
Δ: slight odor
X: intense odor

The results are shown in Table 5.

TABLE 5

|  | Ex.16 | Ex.17 | Ex.18 | Ex.19 | Comp.Ex.12 |
|---|---|---|---|---|---|
| polyalkylene terephthalate resin A | A-1 | A-1 | A-2 | A-2  A-3 | A-2 |
| (parts by weight) | 100 | 100 | 100 | 50  50 | 100 |
| phosphazene compound B | B-5 | B-5 | B-5 | B-5 | — |
| (parts by weight) | 15 | 20 | 25 | 23 |  |
| phenolic resin C | C-3 | C-2 | C-3 | C-3 | C-6 |
| (parts by weight) | 15 | 20 | 25 | 23 | 20 |
| the other flame retardant D | D-1 | D-1 | D-1 | D-1 | D-2 |
| (parts by weight) | 7 | 10 | 12 | 12 | 20 |
| carbonizable resin E | — | E-1 | — | — | — |
| (parts by weight) |  | 40 |  |  |  |
| antioxidant/thermal stabilizer F | F-1  F-3 | F-1  F-4 | F-1 | F-1  F-3 | F-1 |
| (parts by weight) | 0.2  0.2 | 0.2  0.1 | 0.3 | 0.7  0.7 | 0.3 |
| drip inhibitor G | G-1 | G-1 | G-1 | G-1 | G-1 |
| (parts by weight) | 0.7 | 1.0 | 1.0 | 1.0 | 1.0 |
| filler H | — | — | H-1 | H-2 | H-1 |
| (parts by weight) |  |  | 70 | 70 | 60 |
| flame retardancy UL94 | V-0 | V-0 | V-0 | V-0 | V-1 |
| TS Mpa | 57 | 62 | 115 | 122 | 112 |
| FS Mpa | 94 | 101 | 159 | 170 | 155 |
| odor during molding | ○ | Δ | ○ | ○ | X |

As apparent from Table 5, the polyalkylene terephthalates of Examples can be highly improved in flame retardancy with maintaining the excellent properties. Moreover, odor during molding is less, thus insuring improvement in working environment.

What is claimed is:

1. A flame-retardant resin composition which comprises a flame retardant comprising a phosphazene compound and a phenolic resin, and a polyalkylene terephthalate resin, wherein the phosphazene compound comprises at least one member selected from the group consisting of:

(1) a cyclic phenoxyphosphazene compound of the formula

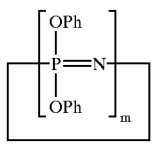

(1)

wherein m is an integer of 3 to 25, and Ph denotes a phenyl group, (2) a linear phenoxyphosphazene compound of the formula

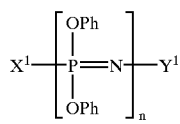

(2)

wherein X represents the group —N=P(OPh)$_3$ or the group —N=P(O)OPh; Y$^1$ represents the group —P(OPh)$_4$ or the group —P(O) (OPh)$_2$; n is an integer of 3 to 10,000; and Ph has the same meaning as defined in the formula (1), and (3) a crosslinked phenoxyphosphazene compound which is formed by crosslinking at least one phenoxyphosphazene compound selected from the group consisting of the cyclic phenoxyphosphazene compound (1) and the linear phenoxyphosphazene compound (2) with at least one crosslinking group selected from the group consisting of o-phenylene group, m-phenylene group, p-phenylene group, and a bisphenylene group shown by the formula (3a):

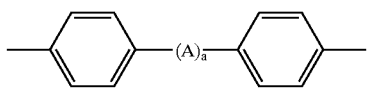

(3a)

wherein A represents —C(CH$_3$)$_2$—, —SO$_2$—, —S— or —O—, and a denotes 0 or 1, wherein the proportion of the crosslinking group in the cross linked phenoxyphosphazene compound is in terms of phenyl group, 0.1 to 50 mol % relative to the total phenyl groups in the phenoxyphosphazene compounds (1) and (2), and wherein the flame retardant comprises a weight ratio of the phosphazene compound to the phenolic resin of from 5/95 to 95/5.

2. A resin composition according to claim 1, wherein the polyalkylene terephthalate resin comprises a polyethylene terephthalate resin or a polybutylene terephthalate resin.

3. A resin composition according to claim 1, wherein the phenolic resin comprises at least one member selected from the group consisting of a phenol-novolak resin, a phenol-aralkyl resin and a polyvinylphenolic resin.

4. A resin composition according to claim 3, wherein the phenol-aralkyl resin comprises a reaction product of a phenol and an aralkyl compound, and the polyvinyl phenolic resin comprises a homopolymer of a polyvinylphenol or a copolymer of a polyvinyl phenol and a copolymerizable monomer.

5. A resin composition according to claim 3, wherein the phenol-novolak resin comprises at least one member selected from the group consisting of (a) a random phenol-novolak resin, (b) a high-ortho phenol-novolak resin, (c) a triazine-modified phenol novolak resin and (d) a phenol-novolak resin containing a free monomer component and/or a dimer component in small amounts.

6. A resin composition according to claim 3, wherein the phenol-novolak resin comprises a phenol-novolak resin in which the total amount of a free monomer component and a dimer component is not more than 20% by weight relative to the whole resin.

7. A resin composition according to claim 1, wherein the amount of the flame retardant is 1 to 100 parts by weight relative to 100 parts by weight of the polyalkylene terephthalate resin.

8. A flame-retardant resin composition which comprises a flame retardant comprising a phenolic resin and a phosphazene compound recited in claim 1, and a polyalkylene terephthalate resin, wherein the phenolic resin comprises at least one member selected from the group consisting of a phenol-novolak resin, a phenol-aralkyl resin and a polyvinylphenolic resin, the flame retardant comprises the phosphazene compound and the phenolic resin in a weight ratio of the former/the latter of from 20/80 to 80/20, and the amount of the flame retardant is 5 to 90 parts by weight relative to 100 parts by weight of the polyalkylene terephthalate resin.

9. A resin composition according to claim 1, which further comprises at least one member selected from the group consisting of a nitrogen-containing flame retardant, a phosphate flame retardant and a carbonizable resin.

10. A resin composition according to claim 9, wherein the nitrogen-containing flame retardant comprises at least one member selected from the group consisting of an aminotriazine, a melamine condensate, a cyanurate of an aminotriazine, and a salt of a pyrophosphoric acid or a polyphosphoric acid with a triazine derivative, wherein the salt of pyrophosphoric acid or polyphosphoric acid is a melamine salt, a melam salt, a melem salt, or a melamine-melam-melem complex salt.

11. A resin composition according to claim 9, wherein the phosphate flame retardant comprises at least one member selected from the group consisting of a phosphate and a polyphosphate.

12. A resin composition according to claim 9, wherein the carbonizable resin comprises at least one member selected from the group consisting of a polycarbonate resin, a polyarylate resin, an aromatic epoxy resin, a polyphenylene oxide resin and a polyphenylene sulfide resin.

13. A resin composition according to claim 1, which further comprises at least one member selected from the group consisting of an antioxidant, a thermal stabilizer, a drip inhibitor and a filler.

14. A process for producing the flame-retardant resin composition, which comprises mixing a polyalkylene terephthalate resin and a flame retardant recited in claim 1.

15. A molded article formed with a flame-retardant resin composition recited in claim 1.

* * * * *

UNITED STATES PATENT AND TRADEMARK OFFICE
CERTIFICATE OF CORRECTION

PATENT NO. : 6,790,886 B2
DATED : September 14, 2004
INVENTOR(S) : Harashina et al.

It is certified that error appears in the above-identified patent and that said Letters Patent is hereby corrected as shown below:

Title page,
Item [73], Assignees, should read:
-- Polyplastics Co., Ltd., Osaka (JP);
Otsuka Chemical Co., Ltd., Osaka (JP) --

Signed and Sealed this

Fourth Day of January, 2005

JON W. DUDAS
*Director of the United States Patent and Trademark Office*